US012346266B2

(12) United States Patent
Ajmera et al.

(10) Patent No.: US 12,346,266 B2
(45) Date of Patent: Jul. 1, 2025

(54) MANAGING CACHES USING ACCESS INFORMATION OF CACHE PAGES

(71) Applicant: Dell Products L.P., Round Rock, TX (US)

(72) Inventors: Mayank Ajmera, Cary, NC (US); Vamsi K. Vankamamidi, Hopkinton, MA (US); Vikram Prabhakar, Apex, NC (US); Jason Raff, Bedford, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/380,274

(22) Filed: Oct. 16, 2023

(65) Prior Publication Data

US 2025/0123972 A1    Apr. 17, 2025

(51) Int. Cl.
   G06F 12/123   (2016.01)
   G06F 12/0882  (2016.01)

(52) U.S. Cl.
   CPC ........ G06F 12/123 (2013.01); G06F 12/0882 (2013.01)

(58) Field of Classification Search
   CPC ...... G06F 12/12; G06F 12/121; G06F 12/123; G06F 12/084; G06F 12/0844; G06F 12/082; G06F 12/0815
   See application file for complete search history.

(56) References Cited

U.S. PATENT DOCUMENTS

| | | | |
|---|---|---|---|
| 6,941,308 B1 | 9/2005 | Chilton | |
| 7,155,573 B1* | 12/2006 | Levin-Michael | G06F 12/123 |
| | | | 711/E12.072 |
| 10,102,147 B1* | 10/2018 | BenHanokh | G06F 12/123 |
| 10,402,096 B2 | 9/2019 | Sen et al. | |
| 11,403,232 B2 | 8/2022 | Barbalho et al. | |
| 2009/0193196 A1* | 7/2009 | Kornegay | G06F 12/127 |
| | | | 711/136 |
| 2014/0025898 A1* | 1/2014 | Iyengar | G06F 12/121 |
| | | | 711/E12.022 |
| 2017/0004083 A1* | 1/2017 | Jain | G06F 12/0868 |
| 2017/0052822 A1* | 2/2017 | Ash | G06F 9/5083 |
| 2017/0344493 A1* | 11/2017 | Ash | G06F 12/122 |
| 2023/0185707 A1* | 6/2023 | Menhusen | G06F 9/546 |
| | | | 711/154 |

* cited by examiner

Primary Examiner — Tracy A Warren
(74) Attorney, Agent, or Firm — BainwoodHuang

(57) ABSTRACT

Improved techniques are directed to managing a cache in an electronic environment in which a first processing core is configured to utilize a first set of queues to reclaim the pages of the cache and a second processing core is configured to utilize a second set of queues to reclaim the pages of the cache. The techniques include adding, to a queue in the first set of queues, an entry identifying access information of a page of the cache. The techniques further include accessing the page by a second processing core. The techniques further include, while the entry is in the first set of queues, updating the access information by the second processing core to indicate accessing the page by the second processing core.

20 Claims, 5 Drawing Sheets

MANAGING CACHES USING ACCESS INFORMATION OF CACHE PAGES

BACKGROUND

A conventional data storage system includes a cache (e.g., a buffer that temporarily stores pages of data) and a CPU with multiple cores that accesses the cache to perform data storage operations. The CPU cores selectively remove pages in the cache to make use of a limited amount of cache storage (e.g., by removing pages with low levels of access ("cold pages") and keeping pages with high levels of access ("hot pages")).

Under a least recently used (LRU) policy, the CPU cores direct the cache to remove pages that the cores have accessed least recently. More specifically, only one CPU core manages a given page at a time and dictates whether to reclaim the page by considering access to the page by only that CPU core. If a second CPU core accesses a page managed by a first CPU core, the second CPU core locks data structures that track page access by respective CPU cores, updates the data structures to indicate that the page is now managed by the second CPU core instead of the first CPU core, and then unlocks the data structures.

SUMMARY

Unfortunately, there are deficiencies in the above-described conventional data storage system that uses locks to transfer reclamation decision-making authority between cores. Assigning and removing locks are computationally intensive, and while a core holds a lock on a data structure, the lock prevents other cores from performing not only operations on the data structure, but also other, downstream operations, e.g., data storage operations of other cores that access pages identified in the data structure. This lock contention is especially pronounced for pages that are accessed by many different cores (e.g., certain high-level metadata pages).

In contrast with the above-described conventional data storage system, improved techniques are directed to updating access information of a cache page without transferring reclamation management between processing cores. Along these lines, a first processing core adds an entry identifying the access information to a set of queues that the first processing core utilizes to reclaim pages of the cache. Later, a second processing core accesses the page, and while the entry is in the set of queues, the second processing core updates the access information to indicate the second processing core accessing the page. In this manner, the second processing core avoids locking the set of queues that the first processing core utilizes to reclaim pages of the cache.

One embodiment is directed to a method of managing a cache in an electronic environment in which multiple processing cores utilize respective sets of queues to reclaim pages of a cache. The method includes adding, to a queue in a first set of queues, an entry identifying access information of a page of the cache. A first processing core is configured to utilize the first set of queues to reclaim the pages of the cache. The method further includes accessing the page by a second processing core. The second processing core is configured to utilize a second set of queues to reclaim the pages of the cache. Additionally, the second set of queues is different from the first set of queues. The method further includes, while the entry is in the first set of queues, updating the access information by the second processing core to indicate accessing the page by the second processing core.

Another embodiment is directed to an electronic environment in which multiple processing cores utilize respective sets of queues to reclaim pages of a cache. The electronic environment includes a first processing core configured to utilize the first set of queues to reclaim the pages of the cache. The electronic environment further includes a second processing core configured to utilize a second set of queues to reclaim the pages of the cache. The second set of queues is different from the first set of queues. The electronic environment further includes memory and control circuitry coupled with the memory, the memory storing instructions that, when carried out by the control circuitry, cause the control circuitry to perform a method of:
 (A) adding, to a queue in a first set of queues, an entry identifying access information of a page of the cache, a first processing core being configured to utilize the first set of queues to reclaim the pages of the cache;
 (B) accessing the page by a second processing core, the second processing core being configured to utilize a second set of queues to reclaim the pages of the cache, the second set of queues being different from the first set of queues; and
 (C) while the entry is in the first set of queues, updating the access information by the second processing core to indicate accessing the page by the second processing core.

Yet another embodiment is directed to a computer program product having non-transitory computer readable medium that stores a set of instructions to manage a cache in an electronic environment in which multiple processing cores utilize respective sets of queues to reclaim pages of a cache. The set of instructions, when carried out by computerized circuitry, cause the computerized circuitry to perform a method of:
 (A) adding, to a queue in a first set of queues, an entry identifying access information of a page of the cache, a first processing core being configured to utilize the first set of queues to reclaim the pages of the cache;
 (B) accessing the page by a second processing core, the second processing core being configured to utilize a second set of queues to reclaim the pages of the cache, the second set of queues being different from the first set of queues; and
 (C) while the entry is in the first set of queues, updating the access information by the second processing core to indicate accessing the page by the second processing core.

In some arrangements, the access information is an access count indicating a number of times that any of the multiple processing cores have accessed the page. Additionally, updating the access information includes, while the entry is in the first set of queues, incrementing the access count to indicate the second processing core accessing the page.

In some arrangements, the method further includes detecting that an amount of available space in the cache has fallen below a predefined size threshold. The method further includes, after detecting that the amount of available space in the cache has fallen below the predefined size threshold, performing a comparison operation that compares the access count to a predefined access threshold. The method further includes, in response to the comparison operation indicating that the access count is greater than the predefined access threshold, promoting the entry from the queue in the first set of queues to a second queue in the first set of queues.

In some arrangements, the queue includes (i) a head entry that the first processing core accessed least recently from among entries in the queue and (ii) a tail entry that the first processing core accessed most recently from among the entries in the queue. Further, performing the comparison operation includes:

(A) in response to detecting that the amount of available space in the cache has fallen below a predefined size threshold, identifying the entry as being the head entry; and (B) in response to identifying the entry as being the head entry, comparing the access count to the predefined access threshold.

In some arrangements, the queue in the first set of queues includes a second entry identifying a second access count of a second page of the cache. The method further includes, in response to detecting that the amount of available space in the cache has fallen below a predetermined size threshold, performing a second comparison operation that compares the second access count to the predefined access threshold. The method further includes, in response to the second comparison operation indicating that the second access count is less than or equal to the predefined access threshold, reclaiming the page from the cache to increase the amount of available space in the cache.

In some arrangements, the method further includes while the entry is in the first set of queues, refraining from assigning a lock on the queue to the second processing core to limit lock contention on the queue.

In some arrangements, the method further includes, in response to identifying the entry as included in the queue in the first set of queues, refraining from adding, to another queue in the second set of queues, another entry identifying the access information of the page.

In some arrangements, the method further includes, after adding, to the queue in the first set of queues, the entry identifying the access information of the page, receiving a second input/output (I/O) request to access the page using the first processing core. The method further includes in response to receiving the second I/O request, assigning a lock on the queue to the first processing core to adjust entries in the queue.

In some arrangements, the cache is a metadata cache constructed and arranged to store indirect pointers that map a logical address space to a physical address space. Additionally, the method further includes accessing the indirect pointers in the metadata cache while performing data storage operations on behalf of a set of host computers.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other objects, features, and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to updating access information of a cache page without transferring reclamation management between processing cores. Along these lines, a first processing core adds an entry identifying the access information to a set of queues that the first processing core utilizes to reclaim pages of the cache. Later, a second processing core accesses the page, and while the entry is in the set of queues, the second processing core updates the access information to indicate the second processing core accessing the page. In this manner, the second processing core avoids locking the set of queues that the first processing core utilizes to reclaim pages of the cache.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
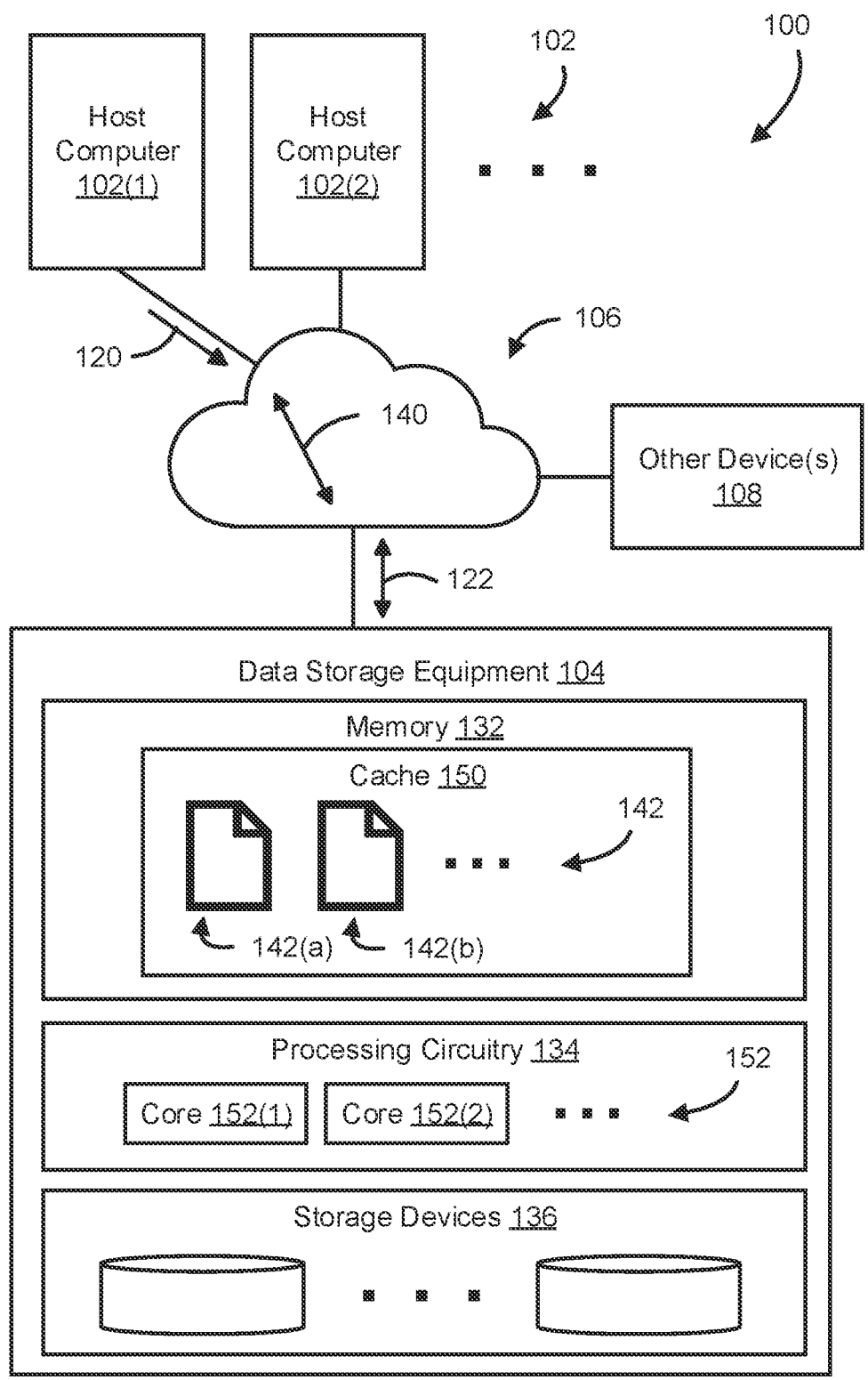
FIG. 1 is a block diagram of an example electronic environment in which embodiments of the improved technique can be practiced.

FIG. 1 shows an example electronic environment 100 that provides cache management in accordance with certain embodiments. The electronic environment 100 includes host computers 102(1), 102(2), . . . (collectively, host computers 102), data storage equipment 104, a communications medium 106, and optionally other devices 108.

Each of the host computers 102 is constructed and arranged to perform useful work. In some embodiments, one or more of the host computers 102 operate as a file server, a web server, an email server, an enterprise server, a database server, a transaction server, combinations thereof, etc. which provide host input/output (I/O) requests 120 to the data storage equipment 104. In some embodiments, the host computers 102 provide a variety of different I/O requests 120 (e.g., block and/or file-based write commands, block and/or file-based read commands, combinations thereof, etc.) that direct the data storage equipment 104 to richly and reliably store host data 122 within and retrieve the host data 122 from storage (e.g., primary storage or main memory, secondary storage, tiered storage, combinations thereof, etc.).

The data storage equipment 104 (e.g., a storage array, a storage system, etc.) includes memory 132, processing circuitry 134, and storage devices 136.

As will be explained in further detail below, the memory 132 includes, among other features, a cache 150 is constructed and arranged to store pages 142(*a*), 142(*b*) . . . (collectively, pages 142) that contain data. In some embodiments, the cache 150 is a metadata cache constructed and arranged to store indirect pointers (IDPs) that map a logical address space to a physical address space. In some embodiments, the cache 150 is a host-data cache that temporarily stores the host data 122.

The processing circuitry 134 includes processing cores 152(1), 152(2) . . . (collectively, processing cores 152) constructed and arranged to access and manage the pages 142 in the cache 150. In some embodiments, the processing cores 152 monitor access to the pages 142 and direct the cache 150 to reclaim the pages 142. In some embodiments, the processing circuitry 134 includes one or more physical storage processors (SPs) or engines, data movers, director boards, blades, I/O modules, storage device controllers, switches, other hardware, combinations thereof, etc.

The storage devices 136 are constructed and arranged to provide persistent/non-volatile storage. In some embodiments, the storage devices 136 provide storage in accordance with one or more RAID data protection schemes and include one or more types of storage drives, e.g., non-volatile random access memory (NVRAM) devices, solid state drives (SSDs), hard disk drives (HDDs), combinations thereof, etc.

In some embodiments, at least some of the storage devices 136 provide non-volatile storage using a mapped-RAID architecture. Moreover, in some embodiments, various physical componentry is virtualized for additional flexibility, fault tolerance, load balancing, etc. (e.g., virtual data movers, virtual storage devices, etc.).

The communications medium 106 is constructed and arranged to connect the various components of the electronic environment 100 together to enable the components to exchange electronic signals 140. At least a portion of the communications medium 106 is illustrated as a cloud to indicate that various embodiments have different topologies including backbone, hub-and-spoke, loop, irregular, combinations thereof, etc. In some embodiments, the communications medium 106 includes copper-based data communications devices and cabling, fiber optic devices and cabling, wireless devices, combinations thereof, etc. In some embodiments, the communications medium 106 supports LAN-based communications, SAN-based communications, cellular communications, WAN-based communications, distributed infrastructure communications, other topologies, combinations thereof, etc.

The other devices 108 represent other possible componentry of the electronic environment 100. Examples of other possible componentry include remote data storage equipment that provides data to and/or receives data from the data storage equipment 104 (e.g., replication arrays, backup and/or archiving equipment, service processors and/or management/control devices, combinations thereof, etc.

During operation, the processing cores 152 access the pages 142 in the cache 150 to respond to the host I/O requests 120 from the host computers 102. For example, in some embodiments in which the cache 150 is a metadata cache, the processing cores 152 access the pages 142 to obtain pointers to storage locations in the storage devices 136. Further details will now be provided with reference to FIG. 2.

Figure 2:
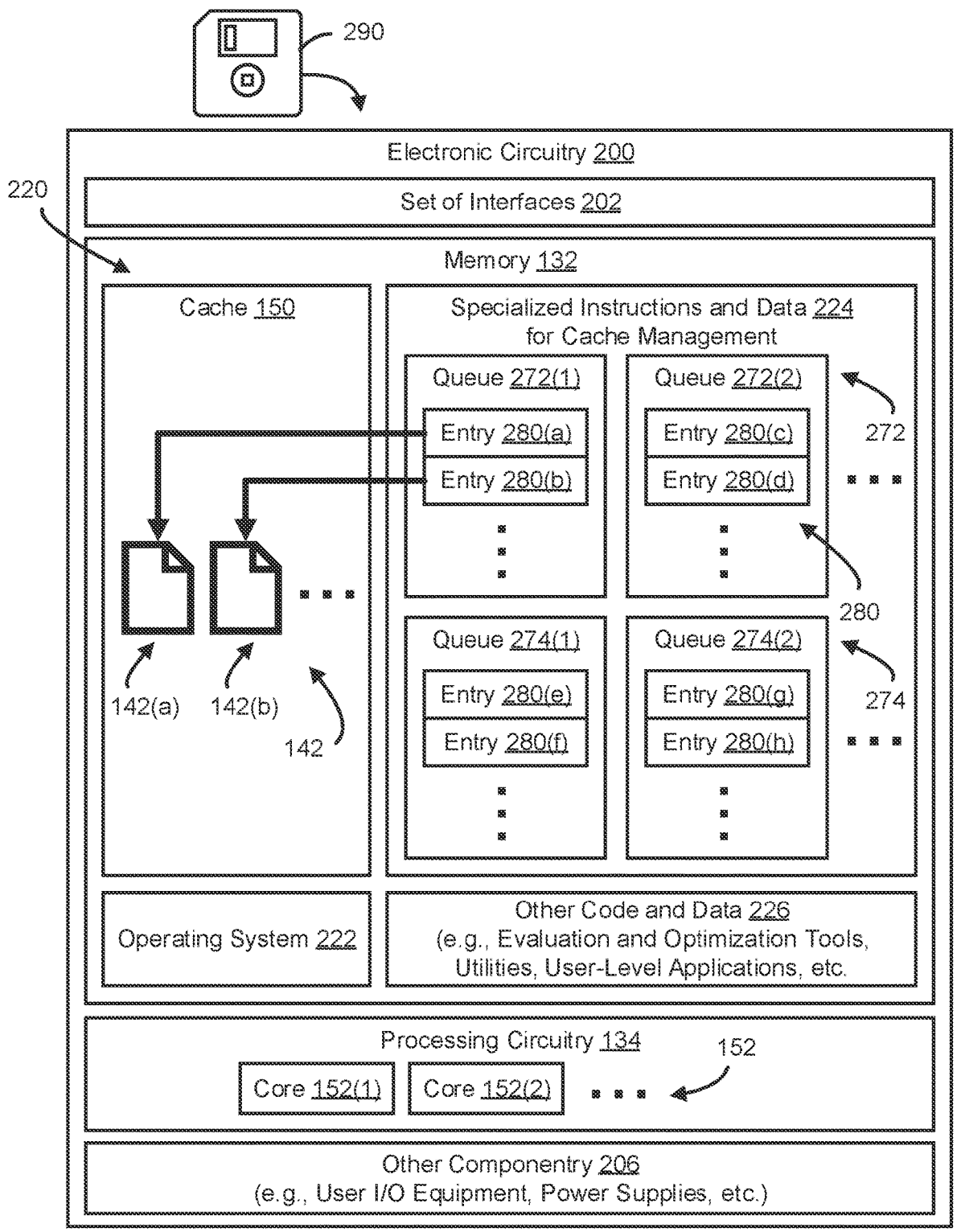
FIG. 2 is a block diagram illustrating additional details of data storage equipment shown in FIG. 1.

FIG. 2 is a block diagram illustrating additional features of the data storage equipment 104 (FIG. 1) in accordance with certain embodiments. As shown, electronic circuitry 200 of the data storage equipment 104 includes a set of interfaces 202, the memory 132, the processing circuitry 134 (including the processing cores 152), and other componentry 206.

The set of interfaces 202 is constructed and arranged to connect the electronic circuitry 200 to the communications medium 106 to enable communications with other devices in the electronic environment 100 (e.g., the host computers 102). In some embodiments, the communications are IP-based, SAN-based, cellular-based, cable-based, fiber-optic-based, wireless, cloud-based, combinations thereof, etc. Additionally, the set of interfaces 202 is constructed and arranged to connect the electronic circuitry 200 to other local equipment such as the storage devices 136. In some embodiments, the set of interfaces 202 includes one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 132 includes both volatile storage (e.g., DRAM, SRAM, etc.) and non-volatile storage (e.g., flash memory, magnetic memory, etc.). The memory 132 stores a variety of software constructs 220 including an operating system 222, specialized instructions and data 224, and other code and data 226.

The operating system 222 refers to particular control code such as a kernel to manage computerized (e.g., processor cycles, memory space, etc.), an I/O stack (e.g., drivers), etc.

The specialized instructions and data 224 provide particular instructions for cache management. In some embodiments, the specialized instructions and data 224 are tightly integrated with or part of the operating system 222 itself. The specialized instructions and data 224 are constructed and arranged to direct the electronic circuitry 200 to manage the pages 142 using queues 272(1), 272(2) . . . (collectively, a first set of queues 272) and queues 274(1), 274(2) . . . (collectively, a second set of queues 274). The queues 272 and 274 are data structures that contain entries 280(a), 280(b), . . . (collectively entries 280) that identify access information of the pages 142 in the cache 150. For example, as shown, the entry 280(a) identifies access information of the page 142(a), the entry 280(b) identifies access information of the page 142(b), etc. In some embodiments, each of the entries 280 includes a pointer to a respective page in the pages 142. It should be understood that the entries 280 and the sets of queues 272 and 274 are provided for example purposes, and some embodiments include more or fewer queues that contain more or fewer entries.

Each of the processing cores 152 is constructed and arranged to utilize a respective set of queues to reclaim the pages 142 of the cache 150, e.g., the first processing core 152(1) utilizes the first set of queues 272 to reclaim the pages 142, and the second processing core 152(2) utilizes the second set of queues 274 to reclaim the pages 142. In some embodiments, when one of the multiple processing cores 152 accesses one of the pages 142, the core updates access information of the page, e.g., by updating an access count. In some embodiments, the access information of the page is contained within the page itself, e.g., within a header of the page. In such embodiments, the core obtains a lock on the page prior to updating the access information of the page.

In some embodiments, the access count of a page indicates a number of times that any of the multiple processing cores 152 have accessed the page. Along these lines, when a core accesses the page, the core increments an access count of the page regardless of whether an entry identifying access information of the page is included in a queue for the core. For example, suppose that the second processing core 152

(2) accesses the page 142(a). As shown, the entry 280(a) identifying access information of the page 142(a) is in the first set of queues 272, indicating that the first processing core 152(1), rather than the second processing core 152(2), dictates whether the cache 150 should reclaim the page 142(a). Regardless, the second processing core 152(2) is configured to increment the access count of the page 142(a). In this manner, the first processing core 152(1) retains control over reclamation decisions. Further, in some embodiments, incrementing the access count of the page 142(a) does not include locking the first set of queues 272, enabling the electronic circuitry 200 to avoid lock contention on the first set of queues 272.

In some embodiments, each set of queues contains queues with different priority levels, e.g., in the set of queues 272, the queue 272(1) has a lower priority level than queue 272(2), and in the set of queues 274, the queue 274(1) has a lower priority level than queue 274(2). Along these lines, when a processing core adds an entry to a set of queues, the processing core adds the entry to a lowest-level queue in the set of queues. Likewise, when the processing core directs the cache 150 to reclaim pages, the processing core selects pages from the lowest-level queue. As will be discussed in greater detail below, in some embodiments, the processing cores 152 are constructed and arranged to use access counts to reclaim pages, promote entries from a lower-level queue to a higher-level queue, and demote entries from a higher-level queue to a lower-level queue.

The other code and data 226 refer to applications and routines to provide additional operations and services (e.g., performance measurement tools, etc.), user-level applications, administrative tools, utilities, etc.

In some embodiments, the processing circuitry 134 is implemented via the one or more processing cores 152 running specialized software, application specific IC (ASICs), field programmable gate arrays (FPGAs) and associated programs, discrete components, analog circuits, other hardware circuitry, combinations thereof, etc. In the context of one or more of the processing cores 152 executing software, a computer program product 290 is constructed and arranged to deliver all or portions of the software constructs 220 to the data storage equipment 104. In particular, the computer program product 290 has a non-transitory (or non-volatile computer readable medium that stores a set of instructions that controls one or more operations of the electronic circuitry 200. Examples of suitable computer readable storage media include tangible articles of manufacture and apparatus that store instructions in a non-volatile manner such as a DVD, a CD-ROM, flash memory, disk memory, tape memory, etc.

The other componentry 206 includes other hardware of the electronic circuitry 200. Along these lines, in some embodiments, the electronic circuitry 200 includes special user I/O equipment (e.g., a service processor), buses, cabling, adaptors, auxiliary apparatus, other specialized data storage componentry, etc. Further details will now be provided with reference to FIG. 3.

Figure 3:
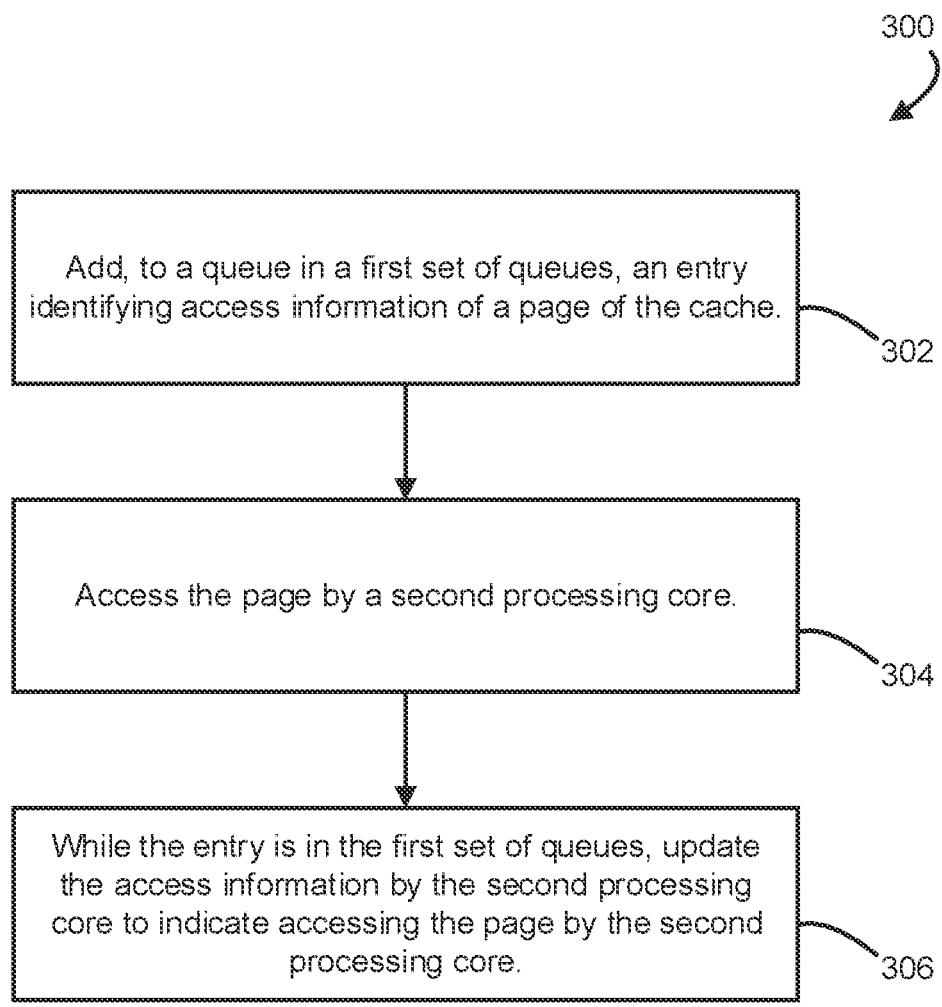
FIG. 3 is a flowchart of a procedure that is performed by electronic circuitry in accordance with certain embodiments.

FIG. 3 is a flowchart of a procedure 300 that is performed by the electronic circuitry 200 in accordance with certain embodiments. The procedure 300 enables the electronic circuitry 200 to manage the cache 150 using access information of the pages 142 in the cache 150.

At 302, the electronic circuitry 200 adds an entry (e.g., entry 280(a)) to the queue 272(1) in the first set of queues 272 that the first processing core 152(1) utilizes to reclaim the pages 142 from the cache 150. In some embodiments, the first processing core 152(1) adds the entry 280(a) to the queue 272(1) in response to receiving a first I/O request to access the page 142(a). As described above in connection with FIG. 2, the entry 280(a) identifies access information of the page 142(a) in the cache 150.

At 304, the second processing core 152(2) accesses the page 142(a). In some embodiments, accessing the page 142(a) is in response to receiving a second I/O request to access the page 142(a). In some embodiments, the second processing core 152(2) accesses the page 142(a) while the entry 280(a) is in the first set of queues 272. It should be understood that, while the entry 280(a) is in the first set of queues 272, the first processing core 152(1), rather than the second processing core 152(2), directs whether to reclaim the page 142(a) from the cache 150.

At 306, while the entry 280(a) is in the first set of queues 272, the second processing core 152(2) updates the access information to indicate the second processing core 152(2) accessing the page 142(a). In some embodiments, updating the access information includes incrementing an access count indicating a number of times that any of the multiple processing cores have access the page 142(a). In this manner, the access count enables the first processing core 152(1) to make reclamation decisions considering not only access by the first processing core 152(1), but also access by other processing cores (e.g., the second processing core 152(2)).

In some embodiments, the second processing core 152(2) updates the access information while refraining from locking the first set of queues 272. Advantageously, refraining from locking the first set of queues 272 enables other cores to access the first set of queues 272. Further details will now be provided with reference to FIG. 4.

Figure 4:
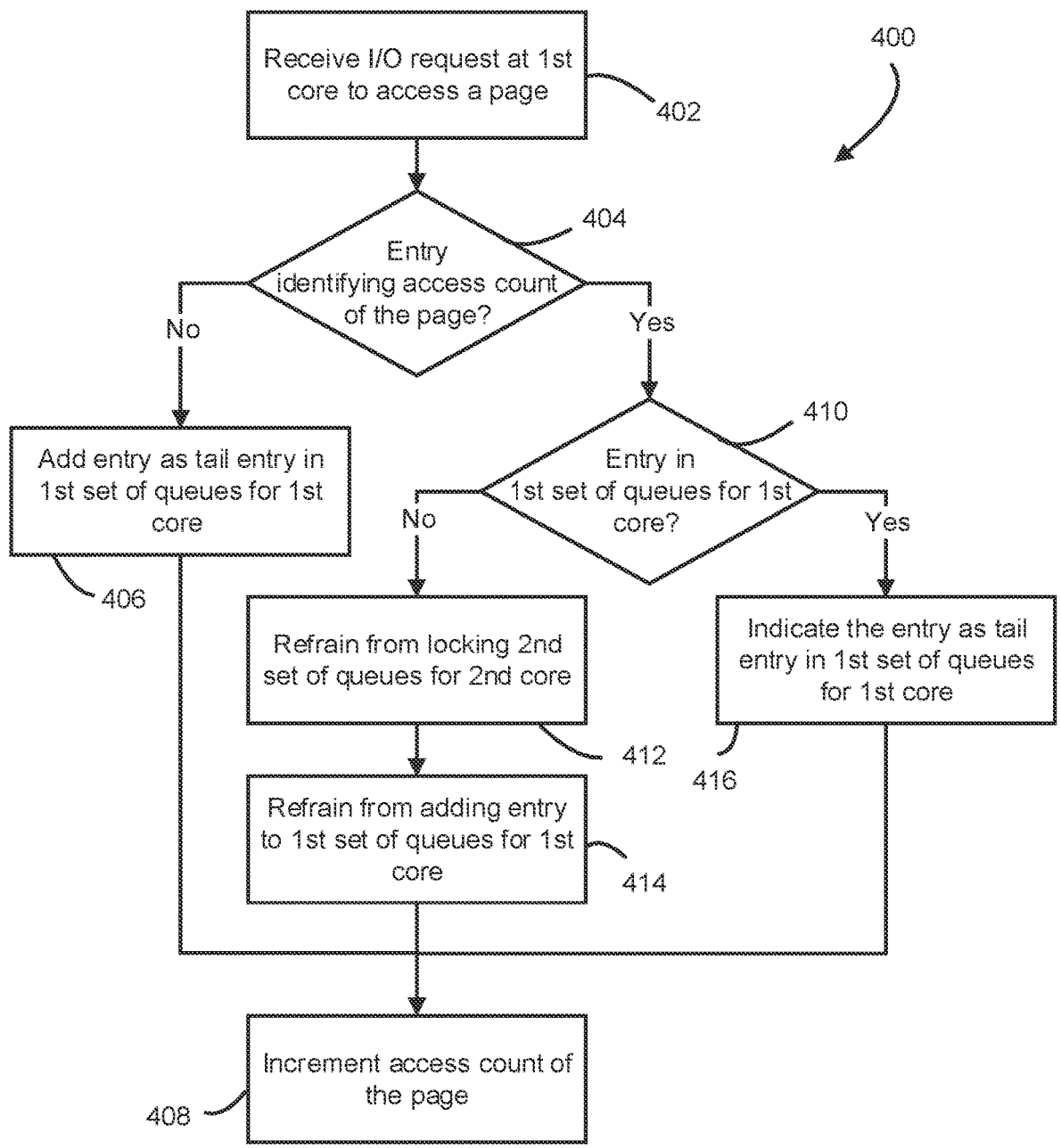
FIG. 4 is a flowchart of a procedure that is performed by electronic circuitry in accordance with certain embodiments.

FIG. 4 is a flowchart of a procedure 400 that is performed by the electronic circuitry 200 in accordance with certain embodiments. The procedure 400 carries out page management when accessing a page in the cache 150.

At 402, the first processing core 152(1) receives a I/O request to access the page 142(n). In some embodiments in which the cache 150 is a metadata cache, the I/O request directs the processing cores 152 to access the pages 142 to obtain pointers to storage locations in the storage devices 136. In some embodiments, the I/O request is provided in response to a cache miss of a separate host-data cache.

At 404, the first processing core 152(1) detects whether the sets of queues 272 and 274 contain an entry identifying an access count of the page. If the entry does not exist, then the procedure 400 proceeds to 406. However, if the entry does exist, then the procedure 400 proceeds to 410. It should be understood that the sets of queues 272 and 274 are provided for example purposes, and in some embodiments, the first processing core 152(1) detects whether additional sets of queues contain the entry.

At 406, the first processing core 152(1) adds the entry as a tail entry in the first set of queues 272. In some embodiments, the first processing core 152(1) adds the entry as a tail entry in a lowest-level queue (e.g., queue 272(1)) in the first set of queues 272. In some embodiments, each entry has an indicator that identifies its position in a queue, e.g., tail entry, head entry, etc. In some embodiments, the tail entry of the queue 272(1) indicates an entry that the first processing core 152(1) most recently accessed from among the entries in the queue 272(1). In contrast, the head entry of the queue 272(1) indicates an entry that the first processing core 152(1) least recently accessed from among the entries in the queue 272(1).

At 408, the first processing core 152(1) increments the access count of the page. In this manner, the access count enables the electronic circuitry 200 to make reclamation decisions on the pages 142 in the cache 150. In some embodiments, incrementing the access count includes modifying information in the header of the page.

At 410, which occurs if there already is an entry identifying the access count of the page, the first processing core 152(1) detects whether the entry is included in the first set of queues 272 that the first processing core 152(1) uses to reclaim the pages 142 in the cache 150. If the entry is instead included in the second set of queues 274 (e.g., the entry is not included in the first set of queues 272), then the procedure 400 proceeds to 412. However, if the entry is included in the first set of queues 272, then the procedure 400 proceeds to 416.

At 412, the first processing core 152(1) refrains from locking the second set of queues 274 in which the entry is located. In this manner, the first processing core 152(1) does not contribute to lock contention on the second set of queues 274. In some embodiments, by refraining from locking the second set of queues 274, the first processing core 152(1) likewise refrains from adding, removing, or reordering the entries in the second set of queues 274. Instead, the second processing core 152(2) retains control over reclamation decisions for the page.

At 414, the first processing core 152(1) refrains from adding the entry to the first set of queues 272 that the first processing core 152(1) uses to reclaim the pages 142. For example, suppose that the entry is included in the second set of queues 274 that the second processing core 152(2) utilizes to reclaim the pages 142. By refraining from adding the entry to the first set of queues 272, the second processing core 152(2) continues to control reclamation decisions for the page. The procedure 400 then proceeds to 408 in which the first processing core 152(1) increments the access count of the page.

At 416, which occurs after detecting that the entry is included in the first set of queues 272, the first processing core 152(1) indicates the entry as a tail entry in the queue in which the entry is located. In some embodiments, the first processing core 152(1) adjusts an indicator that identifies the entry as the tail entry. In some embodiments, the first processing core 152 obtains a lock on the first set of queues 272 prior to reordering entries within the first set of queues 272. The procedure 400 then proceeds to 408 in which the first processing core 152(1) increments the access count of the page. Further details will now be provided with reference to FIG. 5.

Figure 5:
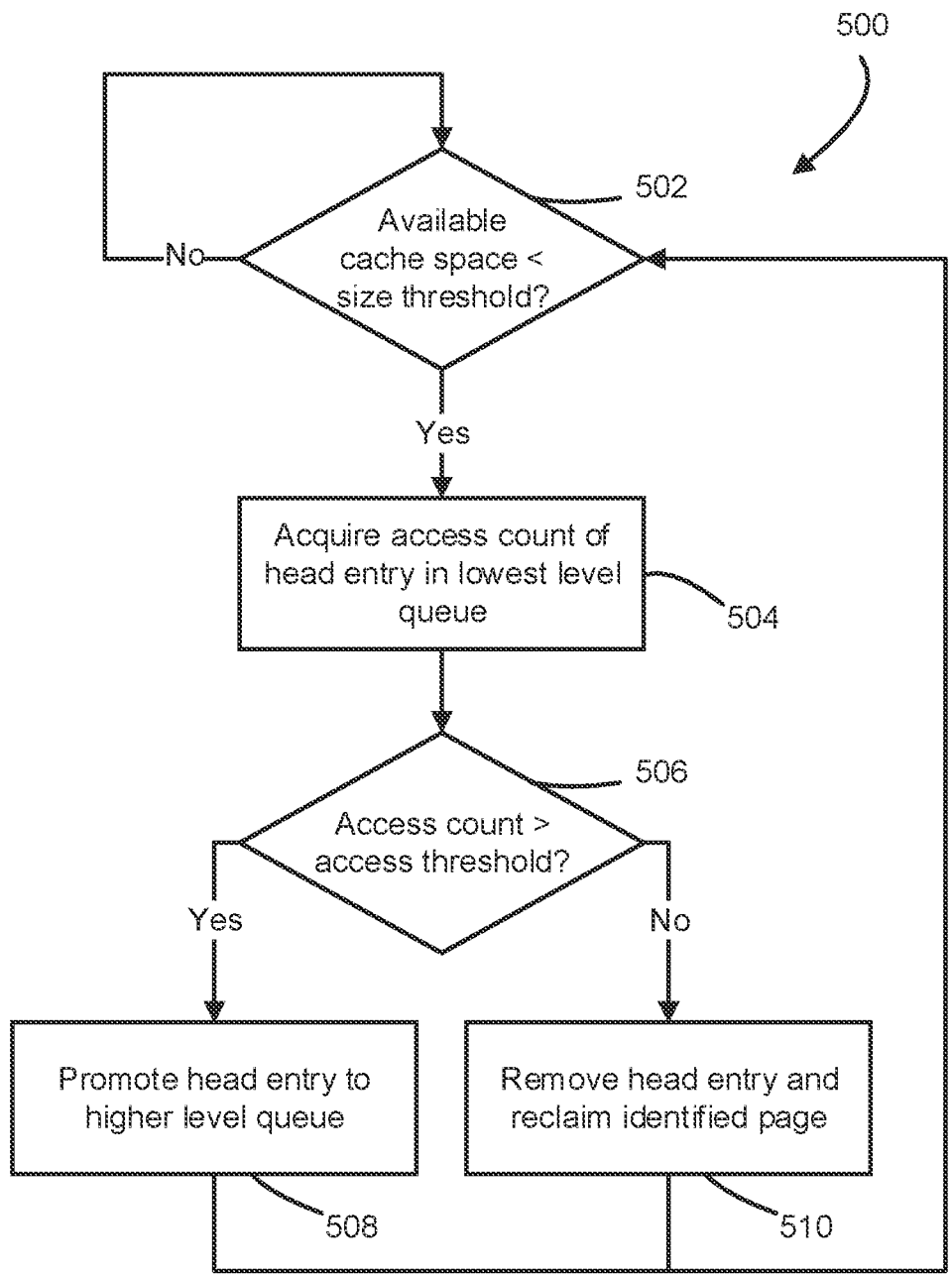
FIG. 5 is a flowchart of a procedure that is performed by electronic circuitry in accordance with certain embodiments.

FIG. 5 is a flowchart of a procedure 500 that is performed by the electronic circuitry 200 in accordance with certain embodiments. The procedure 500 carries out reclaiming the pages 142 from the cache 150.

At 502, the electronic circuitry 200 monitors available space in the cache 150. In some embodiments, the electronic circuitry 200 receives a signal when the available space in the cache 150 has fallen below a predetermined size threshold (e.g., 80% of total cache storage space). In some embodiments, the predetermined size threshold is adjustable. In some embodiments, the electronic circuitry 200 checks the available space in the cache 150 at a predetermined rate, e.g., every time a new page is added to the cache 150, after a predetermined amount of time, etc. If the amount of available space in the cache 150 falls below a predetermined size threshold, then the procedure 500 proceeds to 504.

At 504, the processing core 152(1) uses the head entry 280(*a*) of the queue 272(1) to identify access count of the page 142(*a*). Recall that the access count of a page indicates a number of times that any of the multiple processing cores 152 have accessed the page.

At 506, the processing core 152(1) performs a comparison operation that compares the access count to a predetermined access threshold. If the comparison operation indicates that the access count is greater than the access threshold, the procedure 500 proceeds to 508. Otherwise, the procedure 500 proceeds to 510. In some embodiments, the predetermined access threshold is adjustable, e.g., higher during peak hours, etc.

At 508, the processing core 152(1) promotes the head entry 280(*a*) from the lower-level queue 272(1) to the higher-level queue 272(2). In some embodiments, promoting the head entry 280(*a*) includes designating the entry 280(*a*) as included in the higher-level queue 272(2) rather than the lower-level queue 272(1).

At 510, which occurs when the access count is less than or equal to the predetermined access threshold, the processing core 152(1) removes the head entry 280(*a*) from the queue 272(1) and directs the cache 150 to reclaim the page 142(*a*). In this manner, the processing core 152(1) increases the amount of available space in the cache 150. In certain embodiments, the procedure 500 repeats until the available space in the cache has fallen below the predetermined size threshold.

As described above, improved techniques are directed to updating access information of a cache page without transferring reclamation management between processing cores. Along these lines, a first processing core adds an entry identifying the access information to a set of queues that the first processing core utilizes to reclaim pages of the cache. Later, a second processing core accesses the page, and while the entry is in the set of queues, the second processing core updates the access information to indicate the second processing core accessing the page. In this manner, the second processing core avoids locking the set of queues that the first processing core utilizes to reclaim pages of the cache.

One should appreciate that the above-described techniques do not merely collect and store data. Rather, the disclosed techniques include accessing pages in cache storage and managing the pages in a manner that minimizes lock contention. Accordingly, such techniques enable efficient use of cache storage and promote fast access to pages in the cache.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 100 such as the data storage equipment 104, etc. are capable of being implemented in or "moved to" the cloud, i.e., to remote computer resources distributed over a network. Here, the various computer resources may be distributed tightly (e.g., a server cluster in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN based communications, combinations thereof, and so on.

It should be understood that, in general, as access to a page in a cache ages, it is increasingly less likely the page will be accessed again in the near future. Such pages can be evicted from the cache to make room for other pages. Some embodiments use a reclamation mechanism to track page access. Entries for pages are added to the tail upon access and when pages need to be reclaimed, the reclaim begins with entries at a head of a queue. Each page also maintains an access count that tracks how often it was accessed. In order to categorize the frequency of access, the reclamation mechanism is implemented as three queues each representing three different levels of access and therefore different priorities for reclaim. An entry starts out in the lowest priority queue and once the number of accesses increases beyond a certain threshold, it is moved up to the next higher priority queue. Similarly, as pages are reclaimed, the access count for pages, starting at the highest priority queue, is examined. If the access count is below a certain threshold, the pages are demoted to the next lower priority queue.

In some embodiments, each CPU core has an instance of the reclamation mechanism dedicated to it. Any pages accessed on that CPU core has a respective entry added to its reclamation mechanism. The page also records what CPU core's reclamation mechanism it is on.

Some embodiments limit the lock contention on frequently read pages by not moving the page to the current CPU core's queues if it is already on another CPU core's queues. Instead, the access count on the page will be bumped up to record the fact that the page was accessed recently.

For example, suppose that an entry for a page is on a queue for CPU Core 0 when the page is accessed on CPU Core 1. At this point, instead of moving the entry from the Core 0 queue to the Core 1 queue, the access count for the page will be incremented, and the entry for the page will continue to remain on the Core 0 queue. In this manner, Core 1 avoids needing to lock the Core 0 queue.

Further, in some embodiments, even if the resulting access count exceeds an access threshold for the page to be promoted to a higher priority queue, the page will not be promoted in the context of this access, as doing so would require locking CPU Core 0's queues.

At some time in the future, when CPU Core 0 is instructed to reclaim pages, the core will walk through its queues starting with the lowest priority queue. For any pages that the core encounters with an access count above a promotion threshold, the core will skip over those pages for reclaim and instead promote them to the next higher priority level queue.

In some embodiments, the cache is a metadata cache that stores pages of indirect pointers (IPDs). Along these lines, when a read-miss occurs, a mapper reads the IDPs to locate host data in secondary storage. As certain high-level IDPs (e.g., Top and Mid IDPs) cover a relatively large logical address space (e.g., 512 GB for each Top and 1 GB for each Mid), these IDPs may be read for multiple read-misses on different CPU cores. Advantageously, certain embodiments prevent entries for these pages from moving from one CPU core's queue to another CPU core's queue. As a result, these embodiments reduce locking contention on the queues and enable the read-miss path to be more efficient.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. In an electronic environment in which multiple processing cores utilize respective sets of queues to reclaim pages of a cache, a method of managing the cache, the method comprising:
    adding, to a queue in a first set of queues, an entry identifying access information of a page of the cache, a first processing core being configured to utilize the first set of queues to reclaim the pages of the cache;
    accessing the page by a second processing core, the second processing core being configured to utilize a second set of queues to reclaim the pages of the cache, the second set of queues being different from the first set of queues;
    while the entry is in the first set of queues, updating the access information by the second processing core to indicate accessing the page by the second processing core; and
    based on identifying the entry as included in the queue in the first set of queues, refraining from adding, to another queue in the second set of queues, another entry identifying the access information of the page.

2. The method of claim 1 wherein the access information is an access count indicating a number of times that any of the multiple processing cores have accessed the page; and
    wherein updating the access information includes:
        while the entry is in the first set of queues, incrementing the access count to indicate the second processing core accessing the page.

3. The method of claim 2, further comprising:
    detecting that an amount of available space in the cache has fallen below a predefined size threshold;
    after detecting that the amount of available space in the cache has fallen below the predefined size threshold, performing a comparison operation that compares the access count to a predefined access threshold; and
    in response to the comparison operation indicating that the access count is greater than the predefined access threshold, promoting the entry from the queue in the first set of queues to a second queue in the first set of queues.

4. The method of claim 3 wherein the queue includes (i) a head entry that the first processing core accessed least recently from among entries in the queue and (ii) a tail entry that the first processing core accessed most recently from among the entries in the queue; and
    wherein performing the comparison operation includes:
        in response to detecting that the amount of available space in the cache has fallen below a predefined size threshold, identifying the entry as being the head entry; and
        in response to identifying the entry as being the head entry, comparing the access count to the predefined access threshold.

5. The method of claim 3 wherein the queue in the first set of queues includes a second entry identifying a second access count of a second page of the cache; and
    wherein the method further comprises:
        in response to detecting that the amount of available space in the cache has fallen below a predetermined size threshold, performing a second comparison operation that compares the second access count to the predefined access threshold; and in response to the second comparison operation indicating that the second access count is less than or equal to the predefined access threshold, reclaiming the page from the cache to increase the amount of available space in the cache.

6. The method of claim 1, further comprising:
while the entry is in the first set of queues, refraining from assigning a lock on the queue to the second processing core to limit lock contention on the queue.

7. The method of claim 6, further comprising:
after adding, to the queue in the first set of queues, the entry identifying the access information of the page, receiving a second I/O request to access the page using the first processing core; and in response to receiving the second I/O request, assigning a lock on the queue to the first processing core to adjust entries in the queue.

8. The method of claim 1 wherein the cache is a metadata cache constructed and arranged to store indirect pointers that map a logical address space to a physical address space; and
wherein the method further comprises:
accessing the indirect pointers in the metadata cache while performing data storage operations on behalf a set of host computers.

9. An electronic environment in which multiple processing cores utilize respective sets of queues to reclaim pages of a cache, the electronic environment comprising:
a first processing core configured to utilize a first set of queues to reclaim the pages of the cache;
a second processing core configured to utilize a second set of queues to reclaim the pages of the cache, the second set of queues being different from the first set of queues;
memory;
control circuitry coupled with the memory, the memory storing instructions that, when carried out by the control circuitry, cause the control circuitry to perform a method of:
adding, to a queue in the first set of queues, an entry identifying access information of a page of the cache;
accessing the page by a second processing core;
while the entry is in the first set of queues, updating the access information by the second processing core to indicate accessing the page by the second processing core; and
in response to identifying the entry as included in the queue in the first set of queues, refraining from adding, to another queue in the second set of queues, another entry identifying the access information of the page.

10. The electronic environment of claim 9 wherein the access information is an access count indicating a number of times that any of the multiple processing cores have accessed the page; and
wherein updating the access information includes:
while the entry is in the first set of queues, incrementing the access count to indicate the second processing core accessing the page.

11. The electronic environment of claim 10 wherein the method further includes:
detecting that an amount of available space in the cache has fallen below a predefined size threshold;
after detecting that the amount of available space in the cache has fallen below the predefined size threshold, performing a comparison operation that compares the access count to a predefined access threshold; and in response to the comparison operation indicating that the access count is greater than the predefined access threshold, promoting the entry from the queue in the first set of queues to a second queue in the first set of queues.

12. The electronic environment of claim 11 wherein the queue includes (i) a head entry that the first processing core accessed least recently from among entries in the queue and (ii) a tail entry that the first processing core accessed most recently from among the entries in the queue; and
wherein performing the comparison operation includes:
in response to detecting that the amount of available space in the cache has fallen below a predefined size threshold, identifying the entry as being the head entry; and
in response to identifying the entry as being the head entry, comparing the access count to the predefined access threshold.

13. The electronic environment of claim 11 wherein the queue in the first set of queues includes a second entry identifying a second access count of a second page of the cache; and
wherein the method further comprises:
in response to detecting that the amount of available space in the cache has fallen below a predetermined size threshold, performing a second comparison operation that compares the second access count to the predefined access threshold; and
in response to the second comparison operation indicating that the second access count is less than or equal to the predefined access threshold, reclaiming the page from the cache to increase the amount of available space in the cache.

14. The electronic environment of claim 9, further comprising:
while the entry is in the first set of queues, refraining from assigning a lock on the queue to the second processing core to limit lock contention on the queue.

15. The electronic environment of claim 14 wherein the method further includes:
after adding, to the queue in the first set of queues, the entry identifying the access information of the page, receiving a second I/O request to access the page using the first processing core; and
in response to receiving the second I/O request, assigning a lock on the queue to the first processing core to adjust entries in the queue.

16. The electronic environment of claim 9 wherein the cache is a metadata cache constructed and arranged to store indirect pointers that map a logical address space to a physical address space; and
wherein the method further comprises:
accessing the indirect pointers in the metadata cache while performing data storage operations on behalf a set of host computers.

17. A computer program product having non-transitory computer readable medium that stores a set of instructions to manage a cache in an electronic environment in which multiple processing cores utilize respective sets of queues to reclaim pages of a cache, the set of instructions, when carried out by computerized circuitry, cause the computerized circuitry to perform a method of:
adding, to a queue in a first set of queues, an entry identifying access information of a page of the cache, a first processing core being configured to utilize the first set of queues to reclaim the pages of the cache;
accessing the page by a second processing core, the second processing core being configured to utilize a second set of queues to reclaim the pages of the cache, the second set of queues being different from the first set of queues;

while the entry is in the first set of queues, updating the access information by the second processing core to indicate accessing the page by the second processing core; and in response to identifying the entry as included in the queue in the first set of queues, refraining from adding, to another queue in the second set of queues, another entry identifying the access information of the page.

18. The electronic environment of claim 9 wherein the access information is an access count indicating a number of times that any of the multiple processing cores have accessed the page; and wherein updating the access information includes:
while the entry is in the first set of queues, incrementing the access count to indicate the second processing core accessing the page.

19. The electronic environment of claim 18, wherein the method further includes:

detecting that an amount of available space in the cache has fallen below a predefined size threshold;

after detecting that the amount of available space in the cache has fallen below the predefined size threshold, performing a comparison operation that compares the access count to a predefined access threshold; and in response to the comparison operation indicating that the access count is greater than the predefined access threshold, promoting the entry from the queue in the first set of queues to a second queue in the first set of queues.

20. The electronic environment of claim 9, wherein the method further includes:

while the entry is in the first set of queues, refraining from assigning a lock on the queue to the second processing core to limit lock contention on the queue.

* * * * *